United States Patent [19]

Motegi et al.

[11] Patent Number: 4,623,543

[45] Date of Patent: Nov. 18, 1986

[54] LOW-CALORIE CANDIES

[75] Inventors: Kiyoshi Motegi, Osato; Kichiro Otani, Tokyo, both of Japan

[73] Assignee: Ajinomoto Co., Inc., Tokyo, Japan

[21] Appl. No.: 768,225

[22] Filed: Aug. 22, 1985

[30] Foreign Application Priority Data

Aug. 29, 1984 [JP] Japan .................................. 59-179999

[51] Int. Cl.$^4$ ............................................... A23G 3/00
[52] U.S. Cl. .................................... 426/103; 426/660; 426/804; 426/548
[58] Field of Search ............... 426/103, 658, 660, 804, 426/548

[56] References Cited

U.S. PATENT DOCUMENTS

| | | | |
|---|---|---|---|
| 3,565,765 | 2/1971 | Heady et al. ......................... | 426/660 |
| 4,105,801 | 8/1978 | Dogliotti ............................. | 426/804 |
| 4,408,041 | 10/1983 | Hirao et al. ......................... | 426/804 |

FOREIGN PATENT DOCUMENTS

| | | | |
|---|---|---|---|
| 2432562 | 1/1975 | Fed. Rep. of Germany ...... | 426/804 |
| 0087762 | 5/1985 | Japan .................................. | 426/804 |

Primary Examiner—Jeanette Hunter
Attorney, Agent, or Firm—Oblon, Fisher, Spivak, McClelland & Maier

[57] ABSTRACT

Low-calorie candies made mainly of reducing maltose syrup having a multi-layer structure comprising a core, a sugar-coating, and a protective coating of high-melting fatty substance are disclosed. These candies have good storage stability, are non-hygroscopic and are easy to mold. A sweetening agent of high sweetness is incorporated in the candies, making it possible to produce very tasty candies without adversely affecting the desirable features of maltose-based candies, such as low calorific value and freedom from the danger of tooth decay.

11 Claims, No Drawings

LOW-CALORIE CANDIES

BACKGROUND OF THE INVENTION

1. Field of the Invention

This invention relates to low-calorie candies with high storage stability, with less danger of causing tooth decay and having favorable taste and flavor, and to a process for producing the same.

2. Description of the Related Art

Candies are confectioneries made mainly of sucrose and also, as auxiliaries, other sugars (starch syrup, etc.), dairy products, acidulants, food colors, perfumes and other ingredients. Candies are very diverse in type, ranging from taffies and drops to many other products having complicated compositions.

Sucrose, which is the main material of candies, is readily soluble in water and easily crystallizes from aqueous solution. Upon heating, it forms invert sugar and also tends to undergo condensation and polymerization to yield glutinous substances with high molecular weights, which are considered to be the essence of flavor given off when sucrose is boiled down.

In recent years, demand has been increasing for new types of candies which employ, as the main material, maltitol, coupling sugar or the like in place of sucrose, and are therefore low in calorific value or are difficult to digest.

Such candies using sugar alcohols, glycosylsucrose or the like have the disadvantages of low sweetness, slow reaction in developing sweet taste, high hygroscopicity, and failure to give intended crispness. Particularly, maltitol and reducing maltose syrup containing much maltitol are difficult to crystallize and the crystals, if formed, are highly hygroscopic. In addition, when one tries to produce candies of multi-layer structure, it has been difficult to obtain stable, uniform and firm sugar coating by conventional techniques (using syrup prepared from maltitol, water, binder and other additives). Hence there have been no such candies of multi-layer structure using maltitol or reducing maltose syrup as main materials.

Therefore, nothing is known about those candies made from maltitol or reducing maltose syrup which stably incorporate a sweetening agent of high sweetness (e.g., aspartame) and are thus satisfactory in sweetness, rapid development of sweetness and storage stability.

SUMMARY OF THE INVENTION

Accordingly, it is an object of the invention to provide a technique for making candies from reducing maltose syrup which have a stable multi-layer structure;

It is another object of the invention to provide maltose-based candies which stably incorporate aspartame or other sweetening agents of high sweetness;

It is yet another object of the invention to provide low calorie candies;

It is yet another object of the invention to provide candies which do not cause tooth decay;

It is yet another object of the invention to provide a process for producing low-calorie candies based on reducing maltose syrup;

It is yet another object of the invention to provide reducing maltose syrup-based candies which compare well to sucrose-based candies in both taste and physical properties.

These and other objects of the invention as will hereinafter become more readily apparent have been accomplished by providing a sugar-coating composed mainly of reducing maltose syrup around cores composed mainly of reducing maltose syrup, further providing, as required, an outer coating made of a high-melting fatty substance, and incorporating a sweetening agent of high sweetness in the core or sugar-coating.

DESCRIPTION OF THE PREFERRED EMBODIMENTS

The reducing maltose syrup used as the main material in this invention may be any syrup that contains maltitol as the main component. The weight ratio of reducing maltose syrup in cores should preferably be in the range from 60 to 90%, more preferably from 70 to 75%. The reducing maltose syrup is concentrated to 90% or higher (more preferably to 95% or higher) before molding. The concentration of reducing maltose syrup is preferably carried out in the presence of a saccharified reducing starch (e.g., Towa Kasei Co., "PO-40"), because this adds the proper viscosity and ensures smooth molding. The suitable amount is 10 to 35%, preferably 20 to 25% based on the weight of reducing maltose syrup. After the reducing maltose syrup is concentrated, part or all of the auxiliary materials are admixed as required. Typical auxiliaries include sweetening agents of high sweetness (e.g., aspartame, stevia extract, stevioside, rebaudioside, glycosylstevioside, acesulfame K, saccharin and sodium saccharin), acidulants (e.g., citric acid, malic acid, and juice, extract and essence of fruits), flavorings and colorants.

When an auxiliary which is sparingly soluble or difficult to disperse (e.g., aspartame powder) is to be used, it is preferable to intimately mix it with a reducing maltose syrup powder in advance to accelerate dispersion.

The mixture of materials thus prepared may be molded by any known techniques into any desired shapes (spheres, disks, cubes, etc.).

A sugar-coating is then applied to the surface of each core thus obtained. Reducing maltose syrup (with its viscosity properly adjusted by addition of water or thickener, such as gum arabic, as required) may be used as the coating material, but it is preferable to use a mixture thereof with powder of reducing maltose syrup. In actual practice, it will be advisable to use coarse powder of reducing maltose syrup for priming, followed by coating with fine powder (as intercoating).

The weight ratio of sugar coating to core is generally in the range from about ⅔ to 1/5, but there is no specific limitation thereupon. The sugar coating also contains the remaining auxiliaries; when an auxiliary material which is sparingly soluble or difficult to disperse (like aspartame) is to be used, this should preferably be mixed with reducing maltose syrup powder in advance to facilitate solution or dispersion. The sweetening agent of high sweetness, which is an essential component of the low-calorie candies of this invention may be present in either the core or sugar coating, but it is preferred to add it to both the core and sugar coating to ensure uniform development of sweet taste. The amount of sweetening agent to be added should generally be such that the final products show nearly the same degree of sweetness as that of sucrose-based candies, an amount that will offset the low sweetness of reducing maltose syrup (about 80% of that for sucrose), which must be set for each type of sweetening agent used. When using a colorant, it is advisable to dissolve it in reducing maltose syrup and to apply the colored syrup after intercoating.

The sugar-coating layers thus formed are dried (after priming, intercoating or final coating) preferably at a temperature in the range from 40° to 55° C. for 8 to 15 hours. If the drying temperature exceeds 55° C., decomposition of aspartame can occur. This may result in lowered sweetness or may cause the molded candies to lose their desired shape. If the temperature is lower than 40° C., on the other hand, the drying efficiency is poor, and the molded candies fail to retain their original shape when the drying time is prolonged.

The sugar-coated cores prepared above are then covered, before or after final drying, with a high-melting fatty substance (preferably those substances which melt above 35° C.), such as carnauba wax and rice bran wax, to improve appearance and storage stability.

As may be apparent from the foregoing, the low-calorie candies of this invention have a multi-layer structure comprising a core composed mainly of reducing maltose syrup and a sugar coating composed mainly of reducing maltose syrup and applied to the surface of each core, which improves the storage stability of maltose-based candies which are otherwise highly hygroscopic and difficult to mold. In addition, stable and uniform incorporation of a sweetening agent of high sweetness in such a multi-layer structure makes it possible to give very tasty candies without adversely affecting the features of maltose-based candies (low calorific value and no danger of causing tooth decay).

The invention now being generally described, the same will be better understood by reference to certain specific examples which are included herein for purposes of illustration only and are not intended to be limiting of the invention or any embodiment thereof, unless specified.

EXAMPLES

EXAMPLE 1

| Core Formulation | |
| --- | --- |
| Reducing maltose syrup (Towa Kasei Co., "Malti-Towa") | 2270 g |
| Powder of reducing maltose syrup (Towa Kasei Co., "Powder-Malti") | 50 g |
| Saccharified reducing starch (Towa Kasei Co., "PO-40") | 500 g |
| Aspartame powder | 8 g |
| Citric acid | 64 g |
| Lemon juice | |
| Perfume | |

The concentrated reducing maltose syrup (water content: 15%, 2270 grams) was mixed with saccharified reducing starch, and the mixture was further concentrated to 2130 grams (water content: 3%). To this concentrate were added the mixture of aspartame powder with powder of reducing maltose syrup, and all the other ingredients, and the mixture was agitated, kneaded at 90° to 70° C. and molded into disks weighing one gram each (cores for candies).

| Formulation for Sugar-Coating | |
| --- | --- |
| Syrup | |
| Reducing maltose syrup ("Malti-Towa") | 198 Kg |
| Water | 30 l |
| Gum arabic | 15 Kg |
| Powder of reducing maltose syrup ("Powder-Malti") | 600 g |
| Aspartame powder | 6.5 g |
| Citric acid | |
| Vitamin C | |
| Perfume | |
| Natural pigment | |

The reducing maltose syrup was concentrated to 190 Kg, and the mixture of gum arabic and water was admixed, giving the syrup.

The powder of reducing maltose syrup was sifted on a 100-mesh sieve, and fine powder (20%) and coarse powder (80%) thus separated were each mixed with aspartame, vitamin C and citric acid.

The coarse powder was dispersed in the syrup prepared above, and the dispersion was coated on the surface of cores (priming) and dried at 45° C. for 12 hours. This was followed by intercoating using the fine powder separated above.

The pigment was dissolved in water, the solution was added to the syrup, the colored syrup thus obtained was applied to the intercoated cores, and the colored surface was finally coated with carnauba wax, followed by drying at 45° C. for 12 hours, giving low-calorie candies of this invention (1.5 g/piece).

A test was conducted on storage stability and organoleptic properties, in comparison with the following three control groups: (control group 1) low-calorie candies prepared according to the same formulations and the same method as above, except that no aspartame was added; (control group 2) low-calorie candies prepared by using, for sugar coating, the same formulation as that for cores; and (control group 3) commercial, sucrose-based lemon candies. The result is summarized in Table 1.

EXAMPLE 2

Low-calorie candies were prepared according to the same fomulation and the same procedure as Example 1, except that 14 g of glycosylstevioside (Toyo Seito, "α-G Sweet") was used in place of aspartame.

Furthermore, low-calorie candies were made in the same manner as above except that final coating with canauba wax was omitted. The two samples thus obtained were tested on storage stability and organoleptic properties using, as control, commercial, sucrose-based lemon candies (Horiuchi Food Co., "Lemon-8"). The result is shown in Table 2.

The invention now being fully described, it will be apparent to one of ordinary skill in the art that many changes and modifications can be made thereto without departing from the spirit or scope of the invention as set forth herein.

TABLE 1

| | | | | N = 15 |
| --- | --- | --- | --- | --- |
| Evaluation Items | Control Group 1 | Control Group 2 | Control Group 3 | This Invention |
| Physical properties immediately after preparation: | | | | |
| (Score) | 1.7 | −0.9 | | 1.7 |
| (Comment) | Glossy; favorable | No gloss; poor | | Glossy; favorable |

TABLE 1-continued

| Evaluation Items | Control Group 1 | Control Group 2 | Control Group 3 | N = 15<br>This Invention |
| --- | --- | --- | --- | --- |
| Organoleptic properties immediately after preparation: | appearance | appearance | | appearance |
| (Score) | −0.2 | −0.4 | | 1.8 |
| (Comment) | Low sweetness | Low sweetness | | High sweetness |
| Physical properties after 60 days of storage: | | | | |
| (Score) | 1.6 | −1.1 | 1.8 | 1.6 |
| (Comment) | Lower storage stability | Poor storage stability | High storage stability | High storage stability |
| Organoleptic properties after 60 days of storage: | | | | |
| (Score) | −0.3 | −0.5 | 1.6 | 1.8 |
| (Comment) | Low sweetness | Low sweetness; hygroscopic | High sweetness | High sweetness and rapid development thereof |
| Overall Evaluation | 6.7 | 4.6 | 9.2 | 9.1 |

Score:
+2 (Excellent),
+1 (Good),
0 (Fair),
−1 (Slightly poor),
−2 (Poor)
Overall evaluation: 10-point evaluation
Storage conditions:
(Control groups 1 and 2, this invention): Sealed in cans and stored at room temperature.
(Control group 3); 21 days had elapsed after manufacture when the product was purchased (stored under the same conditions as above thereafter).

TABLE 2

| Evaluation Items | Control | This Invention<br>(Carnauba wax used) | N = 15<br>This Invention<br>(Carnauba wax not used) |
| --- | --- | --- | --- |
| Physical properties immediately after preparation: | | | |
| (Score) | | 2.0 | 1.0 |
| (Comment) | | High gloss; favorable appearance | Insufficient gloss; poor appearance |
| Organoleptic properties immediately after preparation: | | | |
| (Score) | | 0.8 | 0.8 |
| (Comment) | | Poor in sweetness development; tastes bitter | Poor in sweetness development; tastes bitter |
| Physical properties after 60 days of storage: | | | |
| (Score) | 2.0 | 1.8 | 1.3 |
| (Comment) | High storage stability | High storage stability | Slightly lower storage stability |
| Organoleptic properties after 60 days of storage: | | | |
| (Score) | 1.9 | 0.7 | 0.8 |
| (Comment) | Favorable sweetness | Poor in sweetness development; tastes bitter | Poor in sweetness development; tastes bitter |

Scoring method, storage conditions: Same as in Example 1.

What is claimed as new and desired to be secured by Letters Patent of the United States is:

1. A low-calorie candy, which comprises
   (a) a core of 60–90% by weight of concentrated reducing maltose syrup, and at least one ingredient selected from the group consisting of a high intensity sweetening agent, an acidulant, a flavoring agent, and a colorant,
   (b) a coating of concentrated reducing maltose syrup, and at least one ingredient selected from the group consisting of a high intensity sweetening agent, an acidulant, a flavoring agent, and a colorant, wherein the viscosity of said syrup is adjusted with water or a thickener and the weight ratio of sugar-coating to core is from about ⅔ to 1/5, wherein at least one of said core and said coating contains said high intensity sweetening agent.

2. The candy of claim 1, wherein said sweetening agent is aspartame, stevia extract, stevioside, rebaudioside, glyosyl stevioside, acesulfame K, saccharin, or sodium saccharin.

3. The candy of claim 1, wherein said sweetening agent is contained in both said core and said coating.

4. A process for producing a low-calorie candy containing concentrated reducing maltose syrup and a high intensity sweetening agent, which comprises:
   kneading a mixture of 60–90% by weight of reducing maltose syrup which has been concentrated at least 90%, and at least one ingredient selected from the group consisting of a high intensity sweetening agent, an acidulant, a flavoring agent, and a colorant;

molding the kneaded mixture to form a core;

coating the surface of said core with a mixture of concentrated reducing maltose syrup and at least one additional ingredient selected from the group consisting of a high intensity sweetening agent, an acidulant, a flavoring agent, a colorant, and maltose powder;

drying the coated core at 40° to 55° C. to produce a sugar-coated core; and applying a thin film of a high-melting fatty substance to said sugar-coated core, wherein said substance protects said sugar-coated core;

wherein said high intensity sweetening agent is added to at least one of said core and said sugar-coating.

5. The process of claim 4, wherein said drying step is conducted for from 8 to 15 hours.

6. The process of claim 4, wherein the coating mixture comprises concentrated reducing maltose syrup and reducing maltose powder, wherein the reducing maltose syrup serves as a binder for said reducing maltose powder.

7. The process of claim 4, wherein said concentrated reducing maltose syrup further comprises saccharified reducing syrup.

8. The process of claim 7, wherein saccharified reducing starch contained in said core or said sugar-coating is in an amount of 10 to 35% based on the weight of reducing maltose syrup.

9. The process of claim 6, wherein a high intensity sweetening agent is mixed with said powdered reducing maltose syrup before being added to said reducing maltose syrup.

10. The process of claim 4, wherein said high-melting fatty substance is carnauba wax or rice bran wax.

11. The process of claim 4, wherein said high-melting fatty substance melts above 35° C.

* * * * *